March 8, 1960 R. D. McNUTT 2,928,079

MAGNETIC HEAD FOR RECORDING AND READING BINARY DATA

Filed Feb. 21, 1958

*INVENTOR.*
ROBERT D. Mc NUTT
*by*
Lester H. Clark
ATTORNEY

United States Patent Office 2,928,079
Patented Mar. 8, 1960

2,928,079

MAGNETIC HEAD FOR RECORDING AND READING BINARY DATA

Robert D. McNutt, Kingston, N.Y., assignor to International Business Machines Corporation, New York, N.Y., a corporation of New York Application February 21, 1958, Serial No. 716,787

5 Claims. (Cl. 340—174)

This invention relates to magnetic recording and reading heads, and especially to a single head operable either to record or to read.

Magnetic recording is generally carried out by moving a record medium such as a magnetic tape or drum past a recording head comprising a magnetic core having a non-magnetic gap and a coil winding on the core which may be variably energized to change the flux passing through the gap. The record medium is driven transversely to and adjacent to the gap and effectively shunts the gap. The record medium comprises material of high magnetic retentivity, and a record track is developed on the record medium as it passes the gap. The magnetization of the material along the track provides a record of the variation in the energization of the coil. In order to "read" the record, the record medium is moved past a non-magnetic gap in the magnetic core of a reading head having a coil which is not externally energized. The variation in the magnetic field of the record induces a varying electrical energization of the coil.

When a magnetic record medium is used for the recording or storage of binary data, the data is recorded in discrete "bits" by the use of only two readily distinguishable magnetic conditions. Typically, one condition is saturation of the magnetic record track with a magnetic field of one polarity. The other condition is usually saturation with a magnetic field of the opposite polarity, although some systems use a condition in which the record track is demagnetized.

Difficulties have been encountered with recording and reading mechanisms of the prior art, with respect to mechanical misalignment of the record track with the reading head. Such misalignment results in blurred or weak electrical signals in the coil of the reading head. In order to overcome that difficulty, it has been proposed to record on the magnetic medium with a wide head, making a correspondingly wide track, and to read from that track with a narrower head. The difference in widths of the two heads will accommodate an equal mechanical misalignment between the record track and the reading head without adversely affecting the amplitude of the signal produced in the reading head.

It is desirable in magnetic recording to use a single head for both recording and reading. It has not previously been possible to use a single head for both recording and reading and also to use a wide recording track and a narrower reading track.

An object of the present invention is to provide a single magnetic head which is capable of recording binary data on a wide track and reading such data from a substantially narrower track.

The foregoing and other objects of the invention are attained in the structure described herein by providing a head having a main magnetic core with a main non-magnetic gap adjacent and transverse to the path of movement of a magnetic recording medium. At least one auxiliary core means of magnetic material is provided, defining an auxiliary gap shorter than the main gap in the direction transverse to the record medium, and aligned with and adjacent to one end of the main gap. A non-magnetic spacer is provided between the main core and the auxiliary core means. A magnetic shunt connects portions of the auxiliary core means on opposite sides of the gap.

The main gap, the auxiliary gap and the shunt define three paths for magnetic flux, which paths appear in parallel to a magnetomotive force, e.g., a winding, located on the main core and remote from the gap. Such a winding is provided, and is constructed so that when supplied with sufficient electrical current, it is capable of saturating all three parallel paths and the record medium over both the main gap and the shorter auxiliary gap. By supplying the winding with such a current, there may be written on the record medium a binary magnetic record which extends the full width of the main gap and the auxiliary gap.

During reading of the record, the main gap and the auxiliary gap may be considered as two parallel magnetomotive forces. The auxiliary gap is smaller than the main gap and hence provides a smaller magnetomotive force. Furthermore, the reluctance of the shunt is made slightly smaller than the reluctance of the main core. Consequently, all the magnetic flux produced by the auxiliary gap, as well as a small portion of the main gap flux, flows through the shunt, so that the only flux passing through the winding is flux produced by the main gap. The data read from the track is therefore read from a portion thereof only as wide as the main gap. The record medium may therefore shift laterally with respect to the head by an amount equal to the width of the auxiliary gap, without effecting the signal as read.

In the presently preferred embodiment of the invention, as illustrated herein, two auxiliary gaps are used, one at each end of the main gap, and two shunts, one for each auxiliary gap.

Other objects and advantages of the invention will become apparent from a consideration of the following specification and claims, taken together with the accompanying drawings.

Figure 2:
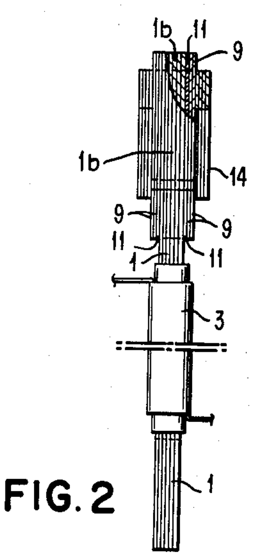
Fig. 2 is a side elevational view of the head of Fig. 1.

As shown in the drawings, a recording and reading head constructed in accordance with the invention comprises two core legs 1 and 2, on which are mounted electrical coils 3 and 4 respectively. The bottom ends of the core legs 1 and 2 are provided with projections 1*a* and 2*a* extending toward one another, and abutting at their ends. The upper ends of the core legs 1 and 2 are provided with diagonally upwardly extending projections or pole pieces 1*b* and 2*b*. The pole pieces 1*b* and 2*b* extend toward each other and are separated at their adjacent ends by a non-magnetic shim 6.

The legs 1 and 2, and projections 1*a*, 2*a*, 1*b*, 2*b*, are referred to herein as the main core, and the pole pieces 1*b*, 2*b* as the main pole pieces. The main core is made up of laminations, each having the form of a leg and the two projections at its ends.

The shim 6 defines a non-magnetic gap over which the record medium (not shown) moves to have magnetic data recorded or read therefrom. That portion of the gap between the pole pieces 1*b*, 2*b*, is identified herein as the main gap.

Along the sides of the pole pieces 1*b* and 2*b*, there are provided pairs of auxiliary pole tips 9 and 10. The shim 6 extends out between both pairs of pole tips 9 and 10 which thereby define auxiliary gaps which are magnetically parallel with the main gap. The pole tips 9 and 10 are spaced from the main core by means of non-magnetic shims 11 and 12.

The various parts may be supported in their several positions by any suitable means (not shown). For a simple and rather crude example, adhesive spray may be used to bind them to the main core structure.

The outer faces of each pair of pole tips 9 and 10 are spanned by a shunt 14 of magnetic material.

Figure 1:
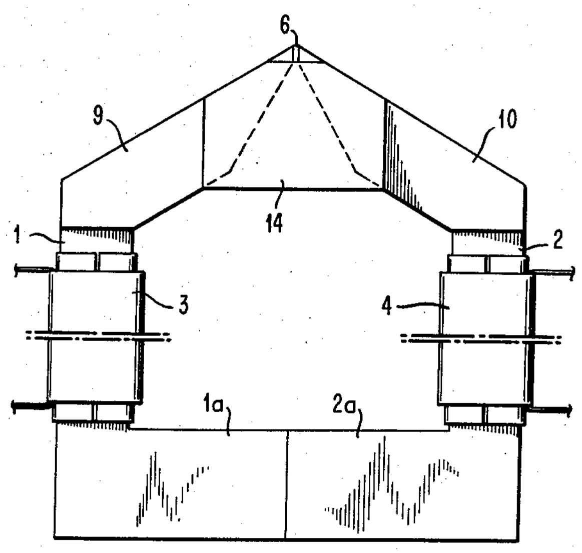
Fig. 1 is an elevational view on an enlarged scale, of a magnetic recording and reading head embodying the invention.
Figure 4:
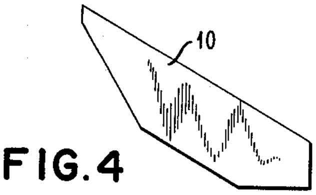
Fig. 4 is an elevational view of a lamination for an auxiliary core in the head of Fig. 1.
Figure 3:
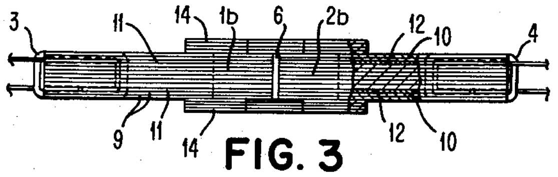
Fig. 3 is a plan view of the head of Fig. 1, with certain parts broken away.

The pole tips 9 and 10 are formed of laminations whose contours on a vertical plane, as viewed in Fig. 1, are the same as the contours of the pole tips 1*b* and 2*b*. The contour of one of these laminations is shown in Fig. 4. The tapering of the main and auxiliary pole tips is provided so that the portions of the main and auxiliary cores immediately adjacent the tips may be saturated completely during writing, while the parts of the magnetic circuit more remote from the writing gap, having a larger cross-section, are unsaturated.

The shunts 14 are formed of laminations whose contour on a vertical plane parallel to the laminations of the main core and the auxiliary pole tips is shown in Fig. 1. Note that the top of each shunt 14 is at or just below the lower end of the non-magnetic gap defined by the shim 6. The shunt 14 must not extend above the lower end of the gap, and may have its upper edge slightly below the lower end of the gap.

The various dimensions and reluctances of the parts of the magnetic circuit are not critical during the writing phase of the operation, as long as the coils 3 and 4 may be energized sufficiently to saturate all the magnetic parts adjacent the gaps and the tape or other record medium running over the gaps.

During the reading phase it is essential that the reluctance of the path through the shunts 14 be less, but only slightly less, than the reluctance of the main core path through the coils 3 and 4. The three gap portions (the main gap and the two auxiliary gaps) may then be regarded as three generally parallel magnetomotive forces. If the magnetic paths have the reluctance relationships stated above, then the shunts are effective to carry all the flux picked up by the auxiliary gaps. However, on account of the reluctance introduced between the main gap and the shunts by the shims 11 and 12, only a small proportion of the main gap flux flows through the shunts. The reluctance of the shims makes the reluctance of the shunt paths greater, to flux from the main gap, than the reluctance of the main core, so that that flux chooses the path of lower reluctance. Consequently, the flux from the main gap flows mostly through the main core and hence through the coils 3 and 4.

In one magnetic recording head constructed in accordance with the invention, and which operated very satisfactorily, the parts were dimensioned as follows:

| | |
|---|---|
| Core legs 1 and 2, cross section | .100" x .029". |
| Pole tips 9 and 10, cross section: | |
| At base | 0.1" x .029". |
| At tip | .020" x .029". |
| Length | .750. |
| Shunt cross section | .016 deep x .172" wide. |
| Shunt, length | .250". |
| Shims 11 and 12 | .0005" thick (beryllium copper). |

All parts except shims are of Mumetal, a commercial magnetic alloy of iron, nickel and copper having a permeability of about $\mu=4{,}000$ at 15 kc.

Figure 5:
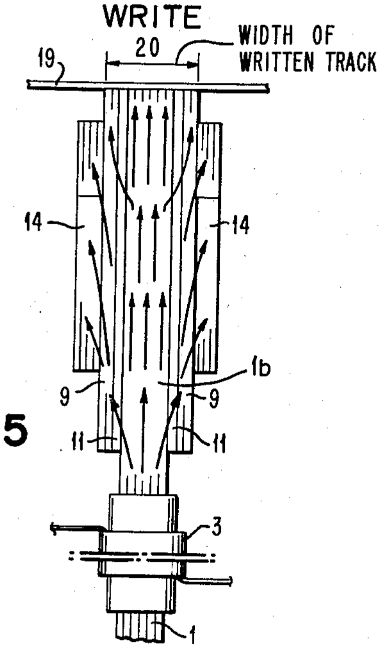
Fig. 5 is a diagrammatic view, generally similar to Fig. 2, illustrating the magnetic flux paths during writing of a magnetic record.

When the head is being used to write on the record medium, for example the tape shown at 19 in Fig. 5, the coils 3 and 4 are connected electrically in series, aiding each other magnetically and are energized sufficiently to saturate magnetically the write track 20 (Fig. 5) including both the portion thereof over the pole pieces **1*b* and 2*b*, and the portion over the pole tips 9 and 10, and thereby makes a record which extends for the full width of the write track as shown at 20** in Fig. 5. The saturation extends over those longitudinal portions of the record where saturation is required according to the particular binary system being used.

The writing operation with the head described is limited to use with binary data recording systems wherein at least one binary value is represented by saturation of the record medium with flux of a particular polarity. (The other binary value may be represented either by saturation with flux of the opposite polarity or by zero magnetization.) If an attempt were made to write with a signal using intermediate values, and using the head described, the resulting track might vary in width with variations in the amplitude of the signal.

Figure 6:
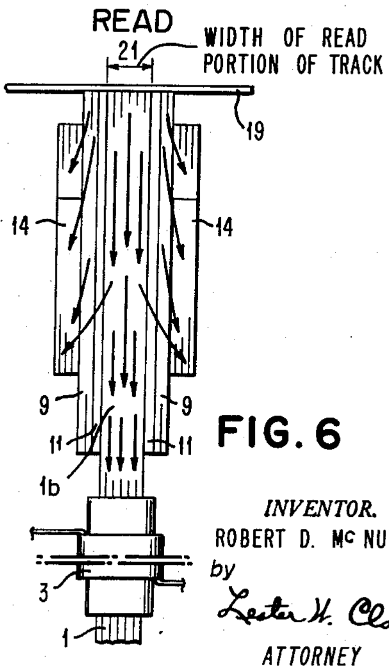
Fig. 6 is a diagrammatic view similar to Fig. 6, but illustrating the magnetic flux paths during reading of a magnetic record.

The record medium in Figs. 5 and 6 is assumed to move perpendicular to the plane of the paper.

On the other hand, when the head is being used for reading, the coils 3 and 4 are not energized. The shunts 14 are then effective to provide a return path for the flux picked up in the pole tips 9 and 10. On account of the reluctance provided by the nonmagnetic spacers 11 and 12, the shunts do not carry more than a minor proportion of the flux picked up by the main core pole pieces **1*b* and 2*b*. The latter flux is effective to energize the windings 3 and 4 which are again connected electrically in series aiding to produce an electrical signal corresponding to the magnetic record on the narrower read track shown at 21 in Fig. 6. The read track 21, instead of being centered in the write track 20 as shown, may be shifted to one side or the other of the center position, as long as it stays within the limits established by the write track 20**.

While I have shown and described a preferred embodiment of my invention, other modifications thereof will readily occur to those skilled in the art, and I therefore intend my invention to be limited only by the appended claims.

I claim:

1. A magnetic recording and reading head comprising a main core of magnetic material having a main non-magnetic gap adjacent and transverse to the path of movement of a magnetic record medium, auxiliary core means of magnetic material defining an auxiliary non-magnetic gap aligned with the main gap transversely of said path and adjacent an end of said main gap, non-magnetic spacer means between said auxiliary core means and said main core, magnetic shunt means abutting and extending between portions of said auxiliary core means on opposite sides of said auxiliary gap, and winding means on said main core energizable to saturate magnetically said main core, said auxiliary core means and said shunt means, and thereby to saturate a track on the record medium extending the full width of the main and auxiliary gaps, so that a magnetic record is recorded on the record medium extending the full width of the main and auxiliary gaps, said shunt means having a reluctance to a magnetomotive force at said auxiliary gap smaller than the reluctance of the main core to said magnetomotive force, and being thereby effective during reading of the magnetic record to shunt the flux variations induced in said auxiliary core means, so that only the magnetic record appearing at the main gap is effective to induce a potential in said winding.

2. A magnetic recording and reading head as defined in claim 1, in which the main core and the auxiliary core means adjacent the respective gaps are tapered so that the core cross-section decreases as the distance from the gap decreases, said core and said core means terminating on opposite sides of the respective gaps in opposed tips having generally plane end faces separated by said spacer means, the portions of said auxiliary core means abutted by said shunt means having the major portion of their abutted areas spaced from said end faces.

3. A magnetic recording and reading head as defined in claim 1, including a second auxiliary core means defining a second auxiliary gap adjacent the opposite end of the main gap, a second non-magnetic spacer means between the second auxiliary core means and the main core, and a second magnetic shunt means abutting and extending between portions of said second auxiliary core means on opposite sides of the second auxiliary gap.

4. A magnetic recording and reading head comprising a main core of magnetic material having a main non-magnetic gap adjacent and transverse to the path of movement of a magnetic record medium, auxiliary core means of magnetic material defining an auxiliary non-magnetic gap aligned with the main gap transversely of said path and adjacent an end of said main gap, winding means on said main core, said main core and said auxiliary core means being saturable by energization of said winding means to produce on said medium a magnetic record extending the full width of the main and auxiliary gaps, and reluctance means including said auxiliary core means and between said auxiliary gap and said winding means, said reluctance means having a reluctance greater than the reluctance of said main core to a magnetomotive force at said main gap, so that only that portion of a magnetic record at the main gap is effective to induce a potential in said winding.

5. A magnetic recording and reading head as defined in claim 4, including magnetic shunt means abutting and extending between portions of said auxiliary core means on opposite sides of said auxiliary gap, said shunt means having a reluctance to a magnetomotive force at said auxiliary gap smaller than the reluctance of the main core to said magnetomotive force, and being thereby effective during reading of the magnetic record to shunt the flux variations induced in said auxiliary core means.

References Cited in the file of this patent

UNITED STATES PATENTS 2,540,711 Camras ---------------- Feb. 6, 1951